(12) United States Patent
Ruottu

(10) Patent No.: US 6,467,438 B1
(45) Date of Patent: Oct. 22, 2002

(54) CIRCULATING BED REACTOR

(75) Inventor: Seppo Ruottu, Karhula (FI)

(73) Assignee: Einco Oy, Karhula (FI)

( * ) Notice: Subject to any disclaimer, the term of this patent is extended or adjusted under 35 U.S.C. 154(b) by 0 days.

(21) Appl. No.: 09/575,371

(22) Filed: May 22, 2000

(30) Foreign Application Priority Data

May 20, 1999 (FI) .................................................. 991151

(51) Int. Cl.⁷ .................................................. F22B 1/00
(52) U.S. Cl. ........................ 122/4 D; 110/216; 110/245; 34/592
(58) Field of Search .................. 122/4 D; 110/216, 110/245; 34/591, 592, 371

(56) References Cited

U.S. PATENT DOCUMENTS

| 5,070,822 A | 12/1991 | Kinni et al. |
| 5,117,770 A | 6/1992 | Hassinen |

FOREIGN PATENT DOCUMENTS

| EP | 0844021 | 5/1998 |
| GB | 1593520 | 12/1977 |
| WO | WO9808599 | 3/1998 |

*Primary Examiner*—Jiping Lu
(74) *Attorney, Agent, or Firm*—Birch Sewart Kolasch & Birch, LLP.

(57) ABSTRACT

A circulating fluidized bed reactor is provided, based on a multi-inlet cyclone, comprising an elongated riser channel (5; 25), which has a lower portion (4; 24) and an upper portion, whereby solid matter and fluidization gas can be fed into the riser through the lower portion (4; 24). In the upper portion of the riser channel, there is a multi-inlet cyclone comprising a separation chamber (7; 27), with a set of guide vanes (6; 26), a central tube (8; 28) connected to the separation chamber, an outlet (11; 31) and a return channel (10; 30). The set of guide vanes (6; 26) of the multi-inlet cyclone, the cyclone chamber (7; 27) and the central tube (8; 28) are annularly fitted about the riser channel (5; 25). The configuration of the circulating fluidized bed reactor allows for advantageous flow dynamics and the reactor may be used as a dryer or steam boiler.

10 Claims, 2 Drawing Sheets

CIRCULATING BED REACTOR

Figure 1:
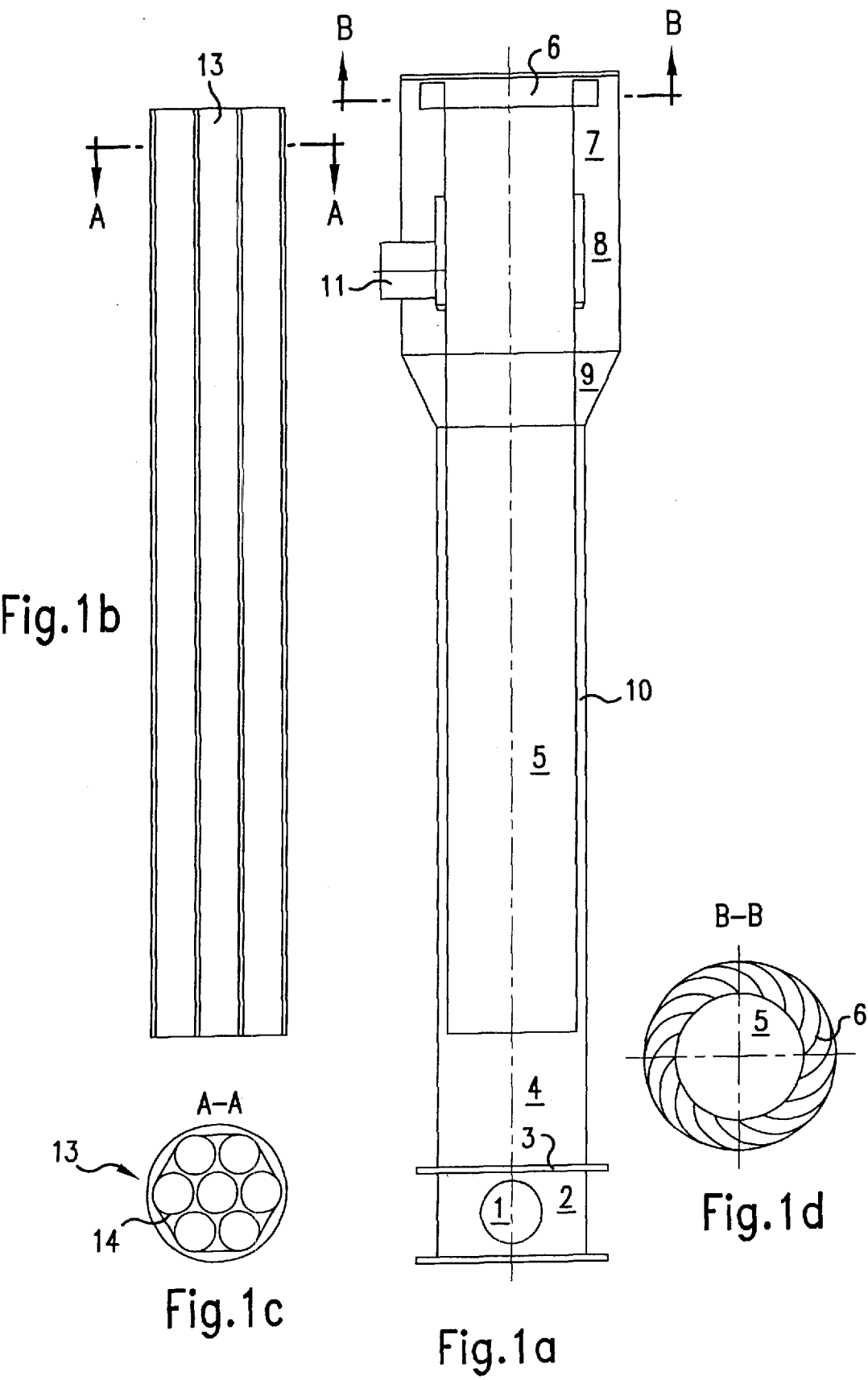

The present invention concerns a novel circulating fluidized bed reactor.

A "Circulating Fluidized Bed (CFB) Reactor" stands for a multiphase flow apparatus formed by gas distribution nozzles, a riser i.e. a riser tube, a cyclone separator and a straight, unregulated return channel, a substantial part of the particles being conducted through the cyclone and returned from the cyclone to the lower part of the riser.

In the first CFB reactors, conventional cyclones of the type having a single inlet were used and the return channel of the solid material comprised a complicated construction with a gas lock, whereby the channel were fitted on the outside of the reaction chamber which made the construction expensive, clumsy as regards flow dynamics, and voluminous. When used, in particular, for steam boilers, this construction was associated with great constructional problems and, as a result of these problems, CFB reactors were subjected to active development work only in the time period after 1980. Since steam boilers were the commercially most interesting applications of CFB reactors, the development work was concentrated on constructions which would remove the known problems of the CFB boilers even with the risk of providing new constructions which, as far as process engineering was concerned, were of inferiour quality. The constructions created as a result of this thinking can be called second generation CFB reactors. Horizontal CFB boilers having quadrical cross section and employing cooled multi-inlet cyclones can, e.g., be mentioned as examples of second generation CFB reactors. All of these had in common that the whole construction was cooled and the protective materials were primarily used only for protection against wear. In small boilers also other part of the boiler had to be provided with insulation masses in order to prevent excessive cooling.

The second generation CFB reactors were poorly applicable to any other use than as steam boilers. In the process, chemical and oil refining industry the reactors are expected to meet requirements on reaction, heat and flow technique rather than constructional technical features. As a result, a new phase of the development work was initiated in the 1990's with the aim of providing multi-inlet, concentrical CFB reactor technology with numerous applications. Since the starting point of the this development phase was formed by the second generation CFB reactors, it is possible to talk about already the third generation CFB reactors. The third generation CFB reactors are characterized by a multi-inlet cyclone fitted concentrically inside the riser.

Not even the third generation CFB reactors were throughout applicable to new applications, such as CFB dryers based on indirect heat transfer. If a multi-inlet cycklone is fitted on the heat transfer part, in accordance with the principles of the third generation solutions, e.g. the following problems occur:

The cyclone portion increases unnecessarily the height of the dryer

In the conical part of the cyclone a rather large pressure drop is generated which is detrimental to the function of the return channel since bed material is concentrated therein In the middle of the heat exchanger a return pipe has to be fitted which has a rather big diameter and which reduces the heat transfer surface and is disadvantageous as regards mechanical strength properties The outer surface of the heat exchanger part cannot be utilized for heat transfer General problems of the third generation CFB reactors are, e.g. that the return channel and the cyclone located inside the reaction chamber are subjected to erosion and, at high reactor temperatures, also to corrosion. Further, the location of the cyclone and the return channel inside the riser chamber reduce mixing in horizontal direction. In several CFB applications (e.g. multistage regenerative heat exchangers) the reaction chamber height and pressure losses thereof become problematically large, because the minimum height is determined by the dimensions of the cyclone and the return channel. In this respect the third generation reactors are considerably much better than the earlier but even these encounter the above limitation which causes practical problems.

It is an aim of the present invention to eliminate the drawbacks of the known technology and to provide an entirely novel circulating fluidized bed construction. In particular, it is an aim of the invention to provide a novel CFB reactor in which the height-to-diameter ratio can be equal to or smaller than 1.

The circulating fluidized bed reactor according to the invention generally comprises an elongated riser which has an at least essentially vertical central axis, feed nozzles fitted at the lower part of the riser for feeding solid matter and fluidization gas into the riser and a separation unit fitted at the upper part of the riser for separation of solids from the fluidization gas. The separation unit preferably consists of a multi-inlet cyclone, comprising a separation chamber with guide vanes for bringing the gas which is being treated into a gas flow directed along the inner surface of the separation chamber for separating the solid matter from the gas mainly under the influence of centrifugal force and a dipleg (return channel) for recovering the solids.

According to the present invention the multi-inlet cyclone and the return channel are fitted annularly outside the riser. In this way a fourth generation CFB reactor is provided which is both fuctionally and constructively entirely different from the third generation CFB reactors.

More specifically, the CFB reactor according to the present invention is characterized by what is stated in the characterizing part of claim 1.

The invention provides considerable advantages. Thus, its most central benefits in comparison to all prior CFB reactor types is that it removes the earlier limitation that the ratio of the height to the diameter should be in practice greater than 1. In the device according to the invention said ratio can be 1 or smaller, e.g. about 0.1 to 0.95.

The flow dynamics of the present solution are beneficial because both the friction of the gas and the centrifugal force drive the particles obtained from the riser channel towards the wall of the cyclone.

If two separate interconnected CFB are used (e.g. a reactor and a regenerator), catalyst exchange between the reactors is easier to accomplish with fourth generation CFB reactors. The use of two separate CFB reactors may be more advantageous that the use of a nested construction when the amount of solids which should be changed is small in comparison to the amount of internal recirculation of the reactors.

Figure 2:
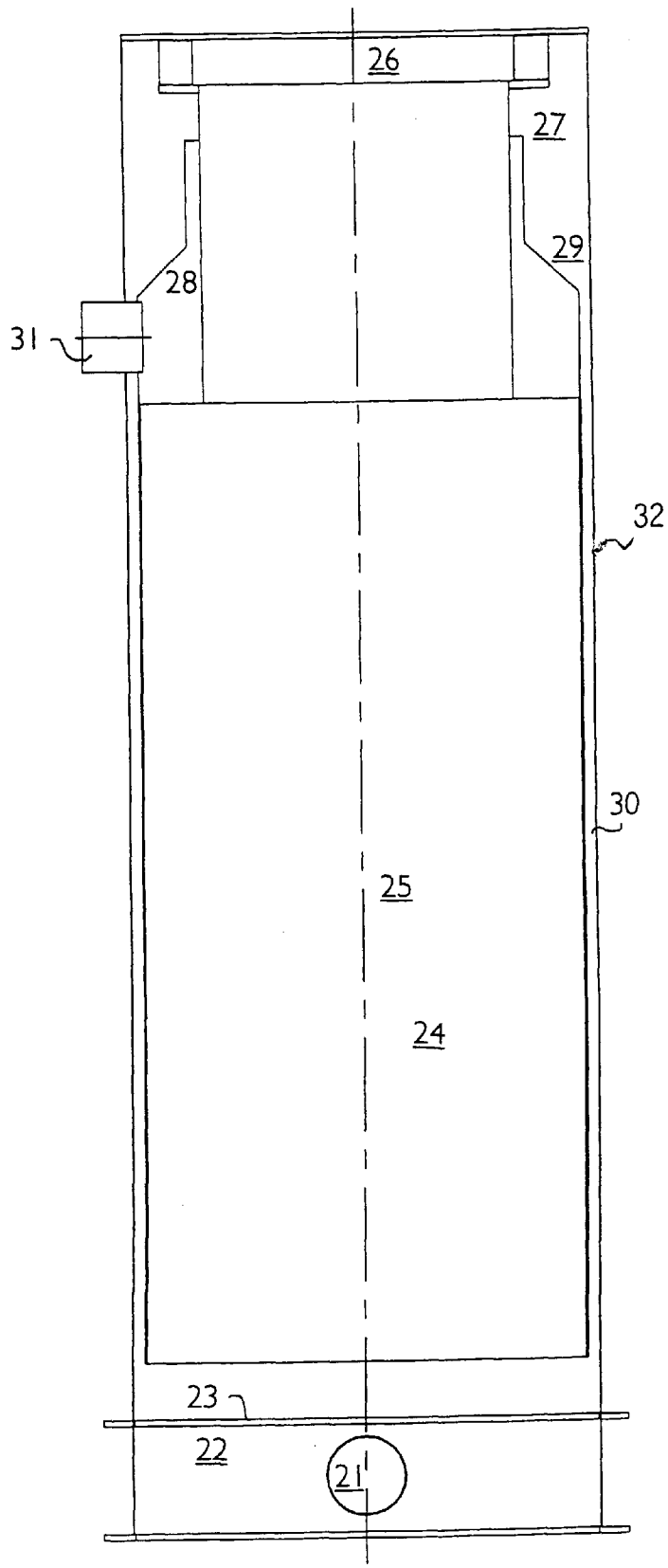

In the following the CFB reactor according to the invention will be described in more detail with reference to the attached drawings, whereby FIG. 1a depicts in a sectional side view the principal construction of a first embodiment of the CFB reactor according to the invention, FIGS. 1b and 1c depict the side view of a riser channel formed by vertical pipes and the top view of section A—A of this riser channel, respectively;

FIG. 1d depicts in top view of the guide vanes of the cyclone of Figure 1a (section B—B); and FIG. 2 depicts in sectional side view the principal construction of a second preferred embodiment of the CFB reactor according to the invention.

The CFB reactor according to the embodiment of FIG. 1 comprises a feed nozzle 1 for fluidization gas, a distribution box 2, a baffle plate 3, an elongated riser channel 5, which has an essentially vertical central axis having a lower portion 4 and a top portion in which there is fitted a separation unit. The separation unit preferably comprises a multi-inlet cyclone 6–11, with a set of cyclone vanes 6, an annular cyclone chamber 7, an annular central pipe 8, a connection cone 9, a return channel 10 and a gas outlet nozzle 11.

It should be emphasized that the attached drawings only depict the principal construction of a circulation fluidisation bed reactor according to the inventions. In practical applications the reactors may, in addition to the afore-mentioned parts, comprise e.g. feed and outlet nozzles which, however, are of no importance as far as the concept according to the invention is concerned.

The circulating fluidized bed reactor according to the invention is operated as follows: Fluidization gas fed from the distribution box 2 via the feed nozzle 1 is conducted through the baffle plate 3 to the lower portion 4 of the riser, wherein the gas and the fluidized particles are mixed. A substantial part of the fluidized particles is conducted with the gas to the riser 4 and further together with the gas to a set of cyclone vanes 6 fitted on the periphery of the upper portion of the riser. The top view of the set of vanes is shown in FIG. 1d. From the set of vanes 6 the gas and the particles are conducted to the cyclone chamber 7 fitted annularly around the riser. The central tube 8 of the cyclone is also fitted annularly about the riser. From the central tube 8 the gases are conducted via nozzle 11 out of the CFB reactor. The flow from the cyclone chamber is brought into a rotating movement in the set of vanes 6 and, as a result of the movement, the particles are carried to the wall of the cyclone chamber 7 and fall into the connection cone 9 of the cyclone chamber 7 and the return channel 10. From the connection cone the particles fall further under the influence of gravity via the return channel 10 back to the lower portion 4 of the riser. As will appear from the drawing, the return channel is fitted about the riser channel.

In FIG. 1, reference numeral 12 designates the top view of the set of cyclone vanes. The vanes which preferably are curved form a plurality (preferably 12 to 40) channels which give the flow which is directed from the inner periphery to the outer periphery of the vanes a vortex having the direction of the perimeter. By fitting the multi-inlet cyclone on the outside of the riser channel instead of on the inside, the flow direction in the set of vanes is changed from against the radius to toward the radius. This, in its turn, gives the functional benefit that in according to the invention both gas friction and the centrifugal force carry the particles against the cyclone wall. In the cyclones of the third generation CFB reactors the centrifugal force carries the particles against the wall but the gas friction drives them from the wall outwards. In this respect the solution according to the invention is more advantageous.

The embodiment of FIG. 1 is best suited to applications in which it is deemed appropriate to maintain a constant sectional area of the riser channel. Applications of this kind are exemplified by indirect dryers in which the riser channel is formed by a tubular heat exchanger (reference numeral 14 stands for tubes) of the kind indicated by numerals 13 and 14 in FIGS. 1b and 1c.

FIG. 2 shows a second preferred embodiment of a CFB reactor according to the invention.

The parts of FIG. 2 mainly correspond to the parts shown in FIG. 1. Therefore, the apparatus includes a feed nozzle 21, a distribution box 22, a baffle plate 23, the lower portion 24 of the riser, a riser 25, a set of cyclone vanes 26, an annular cyclone chamber 27, an annular central tube 28, a connection cone 29, a return channel 30 and a gas outlet nozzle 31.

The reactor of FIG. 2 differs from the embodiment of FIG. 1 in the respect that the diameter of the outer jacket (32) is constant and the cyclone is fitted in the outer jacket of constant diameter by reducing the diameter of the riser in the region of the cyclone. This solution is advantageous for, e.g. steam boiler embodiments, in which the outer jacket is formed by a gas-tight tubular panel. In large-sized steam boilers according to FIG. 2 a distinct advantage is obtained because in addition to the outer jacket the wall of the riser chamber can be easily constructed from the cooled panel walls. Thereby both sides of the wall of the riser chamber and the inner side of the outer wall can be utilized as heat transfer surfaces. As a result the expensive wall panel can be more efficiently utilized and, furthermore, the height of the riser chamber of the boiler is significantly reduced. As a result of the reduced riser chamber height both investment and operation costs savings can be attained.

The return channel can be provided with heat transfer surfaces whereby the heat transfer of the CFB reactor according to the invention can be regulated by the rate of circulating solid matter flow. The return channel can be formed from a plurality of parallel channels. The horizontal section of the CFB reactor according to the invention is most suitably spherical, but within the scope of the same inventive concept it can also be implemented in the horizontal section having various polyhedrical forms. The flow in the central tube 28 and the outlet nozzle 31 can be directed opposite to the directions of FIGS. 1 and 2.

What is claimed is:

1. A circulating fluidized bed reactor comprising:

an elongated riser channel, which has an at least essentially vertical central axis and which has a lower portion and an upper portion, whereby solid matter and fluidization gas can be fed into the riser channel through the lower portion, and a separation unit adapted in the upper portion of the riser channel for separating the solid matter from the fluidization gas, said separation unit being formed by a multi-inlet cyclone which comprises:

a separation chamber, with a set of guide vanes for conducting the gas against the wall of the separation chamber for separating the solid matter from the gas, a central tube connected to the separation chamber, an outlet for removing gases and a return channel for recovering the solid matter, characterized in that the set of guide vanes of the multi-inlet cyclone, the separation chamber and the central tube as well as the return channel are annularly fitted about the riser channel.

2. The circulating fluidized bed reactor according to claim 1, wherein the riser chamber is formed by a plurality of parallel channels.

3. The circulating fluidized bed reactor according to claim 2, characterized the vertical cross section of the channels forming the riser chamber is poly-hedrically shaped.

4. The circulating fluidized bed reactor according to any of the preceding claims, wherein a connection cone and a return channel are annularly fitted about the riser channel.

5. The circulating fluidized bed reactor according to any of claims 1 to 3, wherein the diameter of the riser channel is reduced in the upper portion of the riser channel.

6. The circulating fluidized bed reactor according to claim 5, the diameter of the outer jacket of the reactor is of constant magnitude over the whole length of the riser channel and the cyclone is fitted about the riser channel having an outer wall of constant sectional area at the upper part having reduced diameter.

7. The circulating fluidized bed reactor according to claim 6, wherein the return channel is formed by several parallel channels.

8. The circulating fluidized bed reactor according to claim 5 wherein the return channel is formed by several parallel channels.

9. The circulating fluidized bed reactor according to claim 1, wherein the riser space is formed by a tubular heat exchanger.

10. The circulating fluidized bed reactor according to claim 1, wherein the outer jacket is formed by a gas tight tubular panel.

* * * * *